May 2, 1967 A. T. CESTARO, JR 3,317,672
AUTOMATIC SIGNAL LOGGING SYSTEM
Filed Feb. 7, 1963 3 Sheets-Sheet 1

FIG. I-A

INVENTOR.
ARTHUR T. CESTARO, Jr.
BY
Walter J Kreske
ATTORNEY

FIG. 1-B

INVENTOR.
ARTHUR T. CESTARO, Jr.

BY

ATTORNEY

May 2, 1967 A. T. CESTARO, JR 3,317,672
AUTOMATIC SIGNAL LOGGING SYSTEM
Filed Feb. 7, 1963 3 Sheets-Sheet 3

INVENTOR.
ARTHUR T. CESTARO, Jr.
BY
*Walter J Krecke*
ATTORNEY

United States Patent Office 3,317,672
Patented May 2, 1967

3,317,672
AUTOMATIC SIGNAL LOGGING SYSTEM
Arthur T. Cestaro, Jr., Stoneham, Mass., assignor, by mesne assignments, to James Talcott, Inc., New York, N.Y., a corporation of New York
Filed Feb. 7, 1963, Ser. No. 257,040
17 Claims. (Cl. 179—2)

This invention relates to logging systems and more particularly to automatic information signal logging systems for a plurality of remote information signal sources, and having capability of easy expansion as to numbers of distinct and separate information signals which it can effectively log.

This invention is particularly applicable to the automatic monitoring of radio stations. In the past, it has been customary for radio station personnel to make periodic manual checks of transmitter operating functions. This practice has been found to be inefficient, cumbersome, and subject to human error and consequent down time or malfunction of transmitters and discrepancies in Federal Communications Commission operating requirements, particularly where the transmitter is remotely located with respect to the control station.

These problems have been overcome by the present invention which also achieves other desirable features and advantages. Among these other desirable features and advantages are the provision of an automatic signal information logging system which is modular in nature wherein the number of different transmitter functions and signals which may be independently logged may be relatively easily accommodated by adding relatively minor elements to the basic system.

Another feature is the provision of an automatic signal information logging system which provides a readily readable individual chart recording for each of the desired information signals and operating functions, with the data being continuously recorded in response to a continuous automatic monitoring of the desired transmitter functions. A further feature is the provision of an automatic information signal logging system capable of automatically providing an alarm signal in response to malfunction of the transmitter indicated by an information signal or in the automatic logging system itself. Another feature is the provision of an automatic logging system which automatically, at discrete intervals, provides calibration readings against known standards to insure proper recording and interpretation of the recorded signal information. And, another feature is the provision of a remote automatic logging system which requires only one pair of signal transmitting lines between the recording station and the transmitting station regardless of the number of different information signals and functions to be recorded.

A primary object of the present invention is the provision of an automatic information signal logging system which records repetitively at selected time intervals information signals representing discrete functions of a remotely located mechanism such as a radio transmitter.

Another object is the provision of an automatic information signal logging system which provides a relatively easily readable, permanent, accurate and continuous record of each of a plurality of information signals representing corresponding functions in remotely located equipment. And, another object is the provision of an automatic information signal logging system having a modular capability wherein additional information signals may be easily accommodated by simple and relatively minor additions to the basic system.

A further object is the provision of an automatic information signal logging system which provides attention attracting alarm in response to signal information indicating malfunction of the equipment and/or the logging system itself.

And, a further object is the provision of an automatic information signal logging system having a modular alarm capability wherein the number of information signals for which an alarm function is desired may be increased and respectively accommodated by relatively minor additions to the basic system.

A still further object is the provision of an automatic information signal logging system which is relatively inexpensive to manufacture, is reliable in its operation and rugged in its construction.

These and other objects, features and advantages of the invention are achieved generally by the provision of a pair of signal transmitting lines from the remotely located equipment to a selected recording station, an information signal indexing and cycling arrangement coupled to the remote equipment end of the signal lines with the indexing arrangement coupled through discrete channels to respective functional signal sources in the remote equipment, a plurality of chart recorders at the recording station each for a selected signal from the remote equipment, and an indexing arrangement at the control station coupled through discrete channels to the respective recorders, and a structure responsive to the cycling arrangement for synchronizing the operation of both indexing arrangements.

By providing rotary stepping switches for the indexing devices and a timing motor arrangement with associated cams and cam operated switches for the cycling arrangement, rugged, reliable and continuous time interval indexing between information signals is thereby achieved.

By providing relays at the recorder station with provision for being operated by the combined cam operated switches and indexer at the remote station, suitable synchronization of the indexer at the recording station is thereby achieved.

By providing a separate arrangement for manually energizing the stepping switch at the remote station and the synchronizing relay at the recording station, a suitable manual indexer synchronizing arrangement is thereby achieved.

By providing a separate chart recorder for each of the desired information signals to be logged, not only ease in readability and recording is thereby achieved, but also a modular capability is achieved in that additional recorders may be inserted to handle additional information signals by proper connection to existing stepping switches at the recorder and corresponding electrical connection of position in the stepping switch at the remote station.

These and other objects, features and advantages will become more apparent from the following description taken in connection with the accompanying drawings of a preferred embodiment of the invention and wherein.

The present invention is operable alone as a new installation or may be used in conjunction with existing manual remote control systems. For example, the present invention is compatible with the manual Radio Transmitter Remote Control System, Patent No. 2,779,868. To illustrate this desirable compatibility as well as more clearly show operation of the present invention, a small portion of the circuit from the above-identified patent is included in FIG. 1A and FIG. 1B and the components thereof carry the same identifying numerals as in the above patent, all of which numerals are smaller than the numeral 200. To distinguish the above-numbered components and to insure clarity in identification of components, the present description will commence with the numeral 200.

Referring to FIGS. 1A and 1B in more detail, an automatic information signal recording system made in accordance with the present invention is designated generally by the numeral 200. The automatic information signal logging system 200 includes two major functional assemblies. One of the major functional assemblies is a combined information signal selecting and transmitting assembly 202 (FIG. 1A) which is located at the site of equipment 204, such as a radio transmitter, from which selected function information signals are desired. The other of the major functional assemblies is a combined receiving and recording assembly 206 (FIG. 1B) located at the desired point of control which may be a control station a substantial distance, in the order of miles, away from the remote equipment 204.

In the combined information signal selecting and transmitting assembly 202, a stepping switch 208 having four banks of terminals, 210, 212, 214, and 216, each of which has eleven terminals numbered 1 through 11 as shown and a movable wiper arm 218, 220, 222, and 224 respectively.

The wiper arms 218, 220, 222, and 224 are mechanically coupled by a mechanical linkage 228 to make them move simultaneously and in unison to successively engage the respective terminals 1 through 11. The terminal or contact banks 210 and 212 provide the respective circuits or channels for the information signals from the remote equipment 204. For example, terminal 1 of the contact bank 210 is coupled through a potentiometer 230 to a signal source 232 such as a filament voltage supply if the remote equipment 204 is a transmitter. The other side of this filament voltage supply 232 is coupled through line 234 to corresponding terminal 1 on the contact band 212, thus forming, in this instance, a filament voltage information signal channel 236.

In similar manner terminal 2 of each of the contact banks 210 and 214 are coupled through a potentiometer resistor 238 and line 240 respectively to a second information signal source 242 such as the plate voltage of a transmitter to form a plate voltage information signal channel 244.

Similarly, terminals 3 on the respective contact banks 210 and 212 are coupled through a potentiometer resistor 246 and a line 248 to a signal information source 250 such as a plate current source where the remote equipment 204 is a transmitter, to form a plate current information signal channel 252.

Likewise, terminals 4 on the respective contact banks 210 and 212 are coupled through a potentiometer 254 and a line 256 to any other suitable information signal source 258 at the remote equipment 204 so as to form an information signal channel 260.

Figure 1:
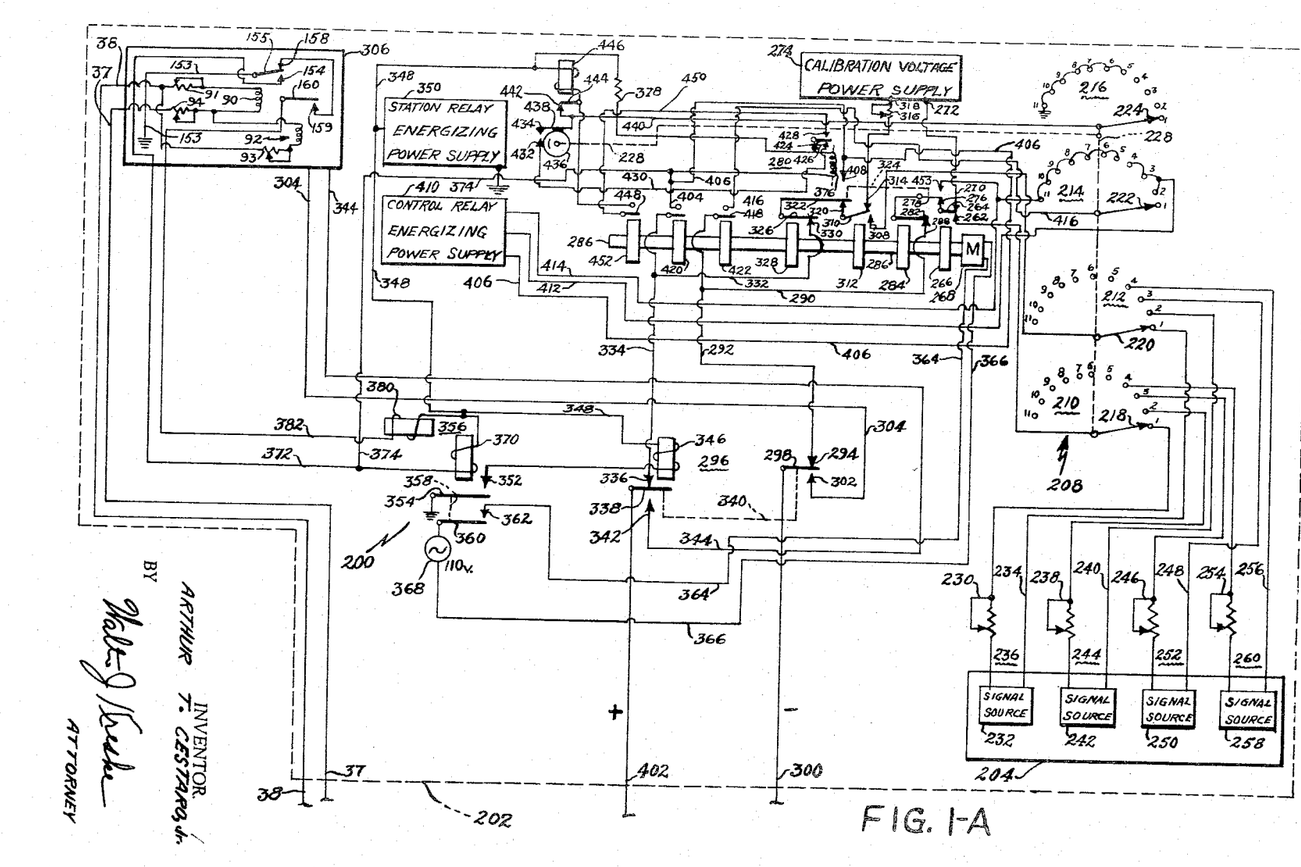
FIG. 1A is a partially block and partially schematic diagram of a preferred embodiment of a portion of the invention.
FIG. 1B is a partially block and partially schematic diagram of a preferred embodiment of another portion of the invention.

While the FIG. 1 embodiment shows only four information signal channels, 236, 244, 252, and 260, additional information signal channels may be added in similar manner to that described by connection to terminals 5 through 11 of each of the terminal banks 210 and 212.

The wiper arm 218 of the terminal bank 210 is coupled through an information voltage signal terminal 262 arranged to be contacted by a movable contact arm 264 in response to a rotary information signal timer 266 cam and rotated by a synchronous timer motor 268. The moveable arm 264 in response to the cam 266 moves selectively between information signal terminal 262 and a second terminal or calibration voltage terminal 270 coupled to the negative side 272 of a calibration voltage power supply 274.

The other or pivotal end of the information signal moveable arm 264 is coupled to a second information signal terminal 276 normally in engagement with a relay arm 278 which is part of a remotely operated station relay 280. The pivotal end of the station relay arm 278 is coupled to the pivotal end of a moveable switching contact arm 282 operated by a switching cam 284 on a common shaft 286 operated by the timing motor 268. The moveable switching contact arm 282 normally makes contact with a switching terminal 288 coupled through a line 290 and a line 292 to a terminal 294 in a manual-to-automatic switching relay 296.

The terminal 294 is normally in engagement with a moveable contact arm 298 in the manual-to-automatic switching relay 296 and has its pivotal end electrically coupled to a suitable signal transmission line 300 such as a telephone wire which feeds the combined receiving and recording assembly 206 as will be hereinafter further described.

The moveable contact arm 298 on being energized by the manual-to-automatic switching relay 296 may engage a terminal 302 coupled through a line 304 to the unnumbered line immediately below the numeral 206 in FIG. 3 of the above mentioned Patent No. 2,779,868.

The FIG. 3 circuit in Patent No. 2,779,868 is represented by the enclosure 306 and carries therein a portion of the circuit of said patent with numerals therein being taken from said patent for more easily understanding operation by reference thereto.

The pivotal end of the wiper arm 220 in the contact bank 212 is electrically coupled to an information signal terminal 308. The information signal terminal 308 may be electrically engaged by an information signal channel moveable contact arm 310 as controlled by an information signal timing cam 312 on the common timing shaft 286. The information signal moveable contact arm 310 thereby selectively makes contact with the terminal 308 and a calibration signal terminal 314 which is coupled through a potentiometer 316 to the positive side 318 of the calibration voltage power supply 274.

The pivotal end of the information signal moveable contact arm 310 is coupled to an information signal relay terminal 320 arranged to be electrically engaged by an information signal moveable relay arm 322 which is tied by a mechanical member 324 to the information signal moveable relay arm 278 to move simultaneously and in unison therewith upon the energizing of the remotely operated station relay 280 as will hereinafter be further described.

The pivotal end of the information signal moveable relay arm 322 is electrically coupled to the pivotal end of a moveable switch arm 326 whose movement is controlled by and responsive to an information signal channel switching cam 328 on the common timing shaft 286 so as to selectively make and break contact with an information signal channel terminal 330 which is coupled through an information signal line 332 and a line 334 to a switching relay terminal 336 in the manual-to-automatic switching relay 296. A movable contact arm 338 is mechanically coupled by a member 340 to the movable contact arm 298 for simultaneous movement therewith and thereby selectively make contact between switching relay terminal 336 and a terminal 342 which is coupled through a line 344 to the other unnumbered line immediately beneath the numeral 206 in FIG. 3 of the above-mentioned Patent No. 2,779,868, a portion of which is shown in the enclosure 306.

The manual-to-automatic switching relay 296 has a solenoid 346, one end of which is coupled through a power line 348 to one side of a station relay energizing power supply 350, the other side of which is coupled to ground. The other side of the solenoid 346 is coupled to a grounding terminal 352 in engageable relation with a movable contact arm 354 of a latching relay 356, the pivotal end of which is grounded. The movable contact arm 354 is fixed by a member 358 to a second movable contact arm 360 for simultaneous motion therewith.

The movable contact power circuit relay arm 360 is arranged to selectively engage a power terminal 362 coupled through a power line 364 to one side of the time motor 268, the other side of which is coupled through a power line 366 to a power source 368 such as a conventional 115 volt 60 cycle power source, the other side of which is electrically coupled to the pivotal end of the movable contact arm 360.

The latching relay 356 has an operate solenoid 370, one side of which is coupled to the power line 348 and the other side of which is coupled through a line 372 to the terminal 154 in the switching relay circuit 306 and through a line 374 to one end of a solenoid 376 in the remotely operated station relay 280, the other end of which is coupled through a resistor 378 to the station relay energizing power supply 350. The latching relay 356 also has a release solenoid 380, one side of which is coupled to the power line 348 and the other side of which is coupled through a line 382 to the pivotal end of the movable contact arm 160 in the switching relay circuit 306.

Wires 37 and 38 coupled to the solenoids 90 and 92 for operating the movable arms 155 and 160 coupled back to the control circuit 10 for operation as described in the above mentioned Patent No. 2,779,868 with the components numbered by the numerals 10 through 160, may be the same components described with reference to the same numerals in said patent. As shown in FIG. 1B, it will be noted that the control circuit 10 is at the combined receiving and recording assembly 206 at the remote control station.

The control circuit 10 has its metering and calibrating lines 48 and 49 coupled to manual metering terminals 381 and 383 respectively in a manually operated manual-to-automatic operation switch 384 in the control station 206. The manual-to-automatic operation switch 384 includes movable arms 386, 388, and 390 fixed by a member 392 to move simultaneously and selectively between terminals 394, 396, and 398 and terminals 380, 382, and 400 respectively. Thereby, when the switch 384 is moved to the left, the metering and calibrating line 48 will be electrically coupled through terminal 381 and movable arm 386 and through transmission line 402, such as a telephone wire, to the pivotal end of the movable relay arm 338. Thus, it will be noted that by means of the manual-to-automatic operation switch 384 and the operation of the manual-to-automatic relay 296 in manner to make the movable contact arms 338 and 298 make circuit with the terminals 342 and 302, the automatic logging system 200 is disconnected from the signal transmission lines 402 and 300 and in place thereof coupled through lines 304 and 344 respectively to the circuit 306 for manual operation as described in the above-mentioned Patent No. 2,799,868.

It is only when the contact arms 338 and 298 are in electrical engagement with the terminals 336 and 294 respectively and the movable contact arms 386, 388, and 390 are in engagement with the terminals 394, 396, and 398 that the automatic logging system 200 becomes operable as will hereinafter be further described.

The terminal 336 is coupled through line 334 and a normally open synchronizing switch 404 and line 406 to a station relay terminal 408 at the remotely operated station relay 280. It will also be noted that line 406 is the common line from a control relay energizing power supply 410 which has a three wire direct current system wherein a second line 412 feeds a low voltage to the jumpers at terminals 2, 3 and 4 of the contact bank 214 for purposes of synchronization as will be hereinafter further described and herein termed synchronizing terminal bank 214.

A third wire 414 carries a substantially higher voltage from the control relay energizing power supply 410 to terminal 11 and by means of jumpers also to terminals 10, 9, 8, 7, 6, and 5 in the present instance in the synchronizing bank 214.

The pivotal end of the wiper arm 222 of the synchronizing bank 214 is coupled through electric power line 416 and a normally open synchronizing switch arm 418 to the line 292 leading to the terminal 294. Synchronizing switches 404 and 418 are operated by synchronizer cams 420 and 422 respectively mounted on the timing shaft 286. Thus, when the synchronizing switches 404 and 418 are closed by the synchronizer cams 420 and 422 respectively, the low voltage across lines 406 and 412 or the high voltage across 406 and 414 will appear at the terminals 336 and 294 of the manual-to-automatic switching relay, depending on whether the synchronizing bank wiper arm 222 is at any of the terminals 2, 3, or 4, or the terminals 5 through 11 respectively of the synchronizing terminal bank 216, for operation as will hereinafter be further described.

The remotely operated station relay 280 also has a grounded movable contact arm 424 for selectively engaging one of the stepper return terminals 426 and 428. The stepper return terminal 426 is coupled through an electric power line 430 to a stepper relay terminal 432 in the stepping switch 208 which is engageable by a movable contact stepper arm 434.

The movable contact arm 434 is controlled by a stepper return cam 436 which is coupled through the linkage 228 to rotate in synchronism with the wiper arm 224 of the stepping relay 208. The movable contact arm 432 is normally in electrical engagement with the stepping relay terminal 432 during the entire rotation of the stepper return cam 436 except when a raised portion 438 on the cam engages the movable arm 434 at which it disengages from the terminal 432 to break the circuit therewith.

The pivotal end of the movable contact arm 434 is coupled through a stepper power line 440 to the wiper arm 224 of the stepper return terminal bank 216. The stepper power line 440 is also coupled to a stepper relay terminal 442 which may selectively be contacted by a stepper movable contact arm 444. The stepper movable contact arm 444 is operated by a stepper relay solenoid 446 and connected to one end of stepper relay solenoid 446 the other end of which is coupled through to power line 348 to the station relay energizing power supply 350. The movable arm 444 end of the solenoid 446 is coupled through a cam operated stepper return timing switch 448 and a line 450 to the stepper return terminal 428 of the remotely operated relay 280. The cam operated stepper return switch 448 is operated by a stepper return timing cam 452 on the shaft 286 for operation as will be hereinafter further described.

Thus, it will be noted that when the cam operated stepper return switch 448 is momentarily closed by cam 452 and the grounded movable contact arm 424 is engaging the remote relay terminal 428 the circuit is completed, including the grounded movable contact arm 424, terminal 428, line 450, cam operated stepper return switch 448, solenoid 446 and grounded station relay energizing power supply 350. Thereby the stepper relay solenoid 446 is energized so as to open the circuit at stepper relay terminal 442 by pulling the stepper movable contact arm 444 away therefrom and thereby simultaneously close stepper contact arm 434 on terminal 432 and, because of linkage 228, the wiper arms 218, 220, 222, and 224 will move from terminal 1 to terminal 2 in their respective banks. Each such momentary closure of the cam operated stepper switch 448 results in the advancement successively to terminals 2, 3, and 4 of the respective wiper arms. However, upon the further advancement of wiper arm 224 to grounded terminal 5 in the bank 216 the circuit is thereby completed from any one of the terminals 5 through 11 of the grounded terminals 5 through 11, wiper arm 224, line 440, terminal 442, movable arm 444, solenoid 446 and the grounded station relay energizing power supply 50, to thereby maintain the solenoid 446 energized each time the stepper movable contact arm 444 touches the stepper relay terminal 442 after being pulled away by the solenoid 446 for each progressive step of the wiper arm 224 between the terminals 5 through 11. On reaching terminal 11, the circuit will again be completed so as to cause a further advancement of the wiper arm 424 to the position 1 shown.

On the other hand, when the remotely operated station relay 280 is energized, the grounded movable contact arm 424 engages the stepper return relay 426 so as to complete a circuit including the grounded movable contact arm 424, terminal 426, line 430, terminals 432 and 434 and all positions of the stepper cam 436 (except that shown in FIG. 1A wherein the contacts are momentarily opened by the raised portion 438), terminal 442, movable stepper contact arm 444, stepper solenoid 446 and the grounded station relay energizing power supply 350. Thereby, regardless of the positions of the wiper arms, 410, 412, 414, 424, they will be stepped successively and intermittently from terminal to terminal until the stepper cam 436 breaks the circuit at the terminal 432.

The cam 436 is so arranged that the raised portion 438 will break the circuit at 432 in each instance leaving the wiper arms 418, 420, 422, and 424 on terminal 1 which is the sequence starting position.

When the remotely operated station relay 280 is energized, the information signal movable relay arm 322 engages the terminal 408 and the movable relay arm 278 engages synchronizing signal terminal 453 which is coupled to the synchronizing higher voltage line 414 leading to the control relay energizing power supply, while terminal 408 is coupled to line 406 leading to the common line leading to the control relay energizing power supply 410. Thereby a high voltage synchronizing signal will appear across the output line 334 and 292 through a circuit as follows, control relay energizing power supply 410, common line 406, control relay 408, contact arm 322, contact arm 326, terminal 330, line 332, and line 334. The high voltage will appear from the relay energizing power supply 410 through line 414, terminal 453, movable contact arm 278, movable contact arm 282, terminal 288, line 290 and output line 292.

The switching cams 328 and 284 are so set that when the wiper arms 218, 220, 222, and 224 are on respective terminals 1, the starting position movable arm 326 will be engaging the terminal 288. Thereby, at this timed position, the high voltage synchronizing signal as described may appear across the output lines 334 and 292 for synchronizing the combined receiving and recording assembly 206 at the control station as will be hereinafter further described.

The combined receiving and recording assembly 206 includes an information and calibration signal receiving and channelling section 454, a relay control and alarm section 456, a synchronized sorting and timing section 458 for channeling selected information signals to selected recorders and a recorder section 460 for recording the selected information signals. Calibration signal receiving and transmitting section 454 includes a pair of signal transmission lines 462 and 464 coupled to the terminals 394 and 396 respectively at the manually operated switch 384 leading to the telephone lines 402 and 300. Line 462 is coupled to a movable wiper arm 466 of an automatic seeking switch 468 of the step-by-step kind herein termed a stepping switch which may be similar to the stepping switch 208 in the combined information signal selecting and transmitting assembly 202. The information and calibration signal transmission line 464 is coupled through a unidirectional current valve 470 such as a diode, a phone line compensation resistance potentiometer 472, a solenoid 474 forming the movement coil of an alarm meter 478 carrying a grounded combined movable wiper 482 in the stepping switch 468.

The meter 478 has included therewith a lower signal level alarm relay 484 with a lower signal level alarm terminal 486 in series with lower level alarm energizing solenoid 488 coupled through a line 490 to one terminal of an alarm relay power supply 492, the other terminal of which is coupled to ground.

The alarm meter 478 also includes an upper signal level alarm relay 494 having an upper signal level alarm terminal 496 in series with an upper signal relay energizing coil 498 coupled through the line 490 to the alarm relay power supply 492. Each of the alarm relays 484 and 494 have a shunting diode 500 and 502 respectively for protecting the respective circuits.

The diode 470 is oriented for positive voltage side coupling at the potentiometer 472. Across the diode 470 is a shunting circuit comprised of a shunting circuit line 504, with one side coupled to the information and calibration line 464 and the other side electrically coupled to the pivotal end of a movable contact arm 506 in the upper signal level alarm relay 494. The shunting movable relay arm 506 is normally disengaged from a shunting relay terminal 508 which is coupled through a return shunting line 510 to a point between the positive terminal of the diode 470 and the line compensation potentiometer 472. The movable shunting relay arm 506 is arranged to contact the shunting terminal 508 upon being energized by the relay energizing coil 498 as will hereinafter be further described.

A shunting diode 512 is coupled across the line 462 to a point on line 464 before the solenoid 474 to protect the alarm meter 478.

The lower signal level alarm relay 484 has a lower signal level alarm contact 514 coupled through a lower signal level line 516 to a terminal 518 in an alarm relay 520, in relay control and alarm section 456.

The lower signal level alarm relay 484 also has a movable arm 522 arranged to make contact with lower signal level alarm terminal 514 when energized by the solenoid 488. The pivotal end of the movable arm 522 is coupled through a line 524 to one side of a thermal time delay relay 526, the other side of which is coupled through a line 528 to the pivotal end of movable contact arm 390 in the manual switch 384. The terminal 398 in the manual switch 384 is coupled through a line 530 to one side of an alternating current power source 532, the other side of which is coupled through a manual on-off switch 534 to a movable contact arm 536 normally in electrical engagement with the terminal 518. Thus, it will be noted that when the switch 534 is manually closed and the movable arm 522 is energized by the alarm solenoid 488 to engage alarm terminal 514, the power source 532 will pass current through the thermal time delay relay element 526 thereby pulling movable arm 538 against terminal 540 so as to complete a circuit consisting of the terminal 540, line 542, manual switch 544 to ground and in the other direction, movable arm 538, line 546, solenoid 548 of the alarm relay 520, line 550 to one side of a station relay energizing power supply 552, the other side of which is coupled to ground. The solenoid 548 will thereby energize movable arm 536 to open from contact 518 to stop further current through thermal time delay relay 526. It will also energize contact arm 554 to close on terminal 556 thereby closing the circuit to an audible alarm 558. It will also pull contact arm 560 in electrical engagement with terminal 562 to close a circuit from the station relay energizing power supply 552, line 550, the solenoid 548, movable arm 560, contact 562, push button switch 544 to ground, thereby insuring continuous operation of the relay 520 even after the thermal time delay relay 526 has opened causing movable arm 538 to move away from the terminal 540 and until the button switch 544 is manually depressed by an operator who is thereby notified of a malfunction.

Energizing of the solenoid 548 will also cause movable arm 564 to electrically engage terminal 566 to complete a circuit consisting of the grounded terminal 566, movable arm 564, visible alarm light 568, line 570, grounded power supply 572 to thereby provide a visible alarm as well as the audible alarm 558.

The relay control and alarm section 456 also includes a low voltage energized control relay 574 having a solenoid 576 coupled at one end through a line 578 and a unidirectional current valve such as a diode 580 to the information, calibration, and control signal transmission line 464. The other end of the solenoid 576 is coupled through a second solenoid 582 of a high voltage energized control relay 584, a line 586, and a potentiometer 588 to the other information, calibration and control signal transmission line 462. A voltage limiting diode 590 is coupled across the solenoids 576 and 582 for limiting the voltage to a selected maximum. In the present instance the low voltage energized control relay 574 is arranged to be energized when 30 volts appears across the lines 578 and 586, while the high voltage relay is arranged to be energized when the voltage appearing across the lines 578 and 586 is 50 volts. The lower voltage relay 574 has a movable arm 590 which upon being energized by the solenoid 576 makes electrical engagement with a grounded terminal 592.

Pivotal end of the movable arm 590 is coupled through a power line 594 and a stepping relay solenoid 596 of the step-by-step seeking relay 468 herein called a stepping switch which may be similar to the stepping switch 208, to line 550 leading to the grounded station relay and energizing power supply 552 so as to cause the stepping relay 468 to be energized when movable arm 590 engages the grounded terminal 592. The power line 594 is also coupled through a terminal 600, stepping switch relay arm 602, line 604 to a movable relay arm 606 of a holding relay 608. The holding relay also includes a contact terminal 610 and another movable arm 612 coupled through a line 614 to a stepping switch terminal 616 electrically engageable with a grounded stepping relay movable arm 618 remains in electrical engagement with the terminals 616 except when stepper cam 620 rotates to the position shown in FIG. 1 wherein raised cam portion 622 causes the movable arm 618 to break circuit with the terminal 616 and in place thereof make circuit with a terminal 624 which is coupled through a starting position signal light 626 to the grounded power supply 572.

The stepper starting position cam 620 is coupled by a member 628 to the wiper arms 630, 466, 482, and 632 in stepper switch terminal banks 634, 636, 638, and 640 respectively for purposes to be hereinafter further described. The holding relay 608 also has a holding relay solenoid 642 coupled at one end through a line 644 to a terminal 646 engageable by movable arm 612, and a movable arm 648 in the high voltage relay 584 which is electrically engageable with a grounded terminal 650. Holding relay solenoid 642 is coupled at the other end through resistor 652 and line 550 to the station relay energizing power supply 552. Thus, when the higher voltage relay 584 is energized causing the movable arm 648 to close the circuit on the terminal 650, current will flow through the solenoid 642 so as to energize the holding relay 608 thereby causing movable arm 112 to engage the terminal 646 and movable arm 606 to engage the terminal 610. The contact of the movable arm 612 against the terminal 646 will then continue to energize the holding relay so long as the grounded movable stepper arm 622 is engaging the stepper terminal 616. The movable arm 606 on contacting the terminal 610 causes current to flow through the arms 602 and 600 and stepping relay solenoid 596 so as to energize the stepping relay 458 to index the wiper arms 630, 466, 482, and 632 in manner of stepping switches.

Each of the terminal banks 634, 636, 638, and 640 have terminals numbered 1 through 11 for contact by the respective wiper arm in similar manner to that in the stepping switch 208 described above. In the information signal terminal bank 636, terminals 1, and in the local calibration signal terminal bank 458, terminal 2, are electrically coupled through a line 654 and a potentiometer 656 to one side of a chart recorder 658 in the recorder section 460. The other side of the chart recorder 658 is coupled through a line 660 and a solenoid 662 of an alarm meter indicator 664 and line 666 to terminals 1 of the information signal terminal bank 638 and to terminal 2 of the local calibration signal terminal bank 640. While any suitable recorder may be used as the recorder 658, a recorder carrying the trademark Rustrak, manufactured by the Rust Industrial Company, Nashua, N.H., has been found particularly satisfactory. To run the recorder timing motor (not shown) for operating the chart mechanism, power from a conventional 60 cycle, 110 volt power source 668 may be coupled to the recorder 658 by lines 670 and 672 through manual on-off switch 674. Thus, with the manual switch 674 closed and the wiper arm 466 on terminal 1 in terminal bank 636, information signals coming through line 462 will appear at and be recorded by the chart recorder 658. Any variation of information signals appearing at the chart recorder 658 and thereby through the alarm solenoid 662 causing grounded pointer and contact arm 676 to continuously indicate the signal which upon varying beyond the limits set by limit terminals 678 and 680, energize alarm solenoid 682 by grounding power line 490 to the alarm relay power supply 492 so as to bring movable arm 686 in electrical engagement with terminal 688 and thereby complete the circuit through lines 690 and 692 respectively to the lines 524 and 516 respectively leading to the terminal time delay relay 526 for energizing the alarm 558 as described above.

In similar manner a recorder 694, similar to recorder 658, is coupled on one side through a potentiometer 696 similar to the potentiometer 656 and line 698 to terminal 2 of the information signal terminal bank 636 and to terminal 3 of the calibration signal terminal bank 634. The other side of the recorder 694 is coupled through a line 700 to information signal terminal bank 638, terminal 2, and to terminal 3 of the local calibration signal bank 640. Thus when wiper arms 466 and 482 are on respective terminals 2, information signals from the lines 462 and 464 will be recorded in the recorder 694.

In the present instance, two additional recorders 702 and 704 are shown in FIG. 1 illustration and carry potentiometers 706 and 708 similar to the potentiometers 656 and 696 and are coupled to terminals 3 and 4 respectively in the terminal bank 636. They also have lines 710 and 712 which are coupled to terminals 3 and 4 respectively in the terminal bank 638. Thus, recorder 702 will record information signals in lines 462 and 464 when the wiper arms 466 and 482 are on the respective terminals 3 and the recorder 704 will indicate such signals when the wiper arms 466 and 482 are on the respective terminals 4. Additional recorders may be added to the present system by making similar electrical coupling to terminals 5 through 11 in the terminal banks 636 and 638.

A local calibration voltage power supply 714 has its negative terminal coupled to the wiper arm 630 in the local calibration signal terminal bank 634 and its positive terminal coupled through a potentiometer 716 to the wiper arm 632 in the local calibration signal terminal bank 640.

Recorder 702 besides being coupled through potentiometer 706 and line 707 to terminal 3 of the information signal stepping switch bank 636, is also coupled to terminal 4 of the local calibration signal stepping switch bank 634. The other side of the recorder 702 besides being coupled through line 710 to terminal 3 in the information signal stepping switch bank 638, is also coupled to terminal 4 of the local calibration signal stepping switch bank 640.

The recorder 704 besides being coupled through potentiometer resistor 708 and a line 709 to terminal 4 of the information signal stepping switch bank 636, is also coupled to terminal 1 of the local calibration signal steppings switch bank 634. The other side of recorder 704 besides being coupled through line 712 to terminal 4 of the information signal stepping switch bank 638, is also coupled to terminal 1 of the local calibration signal stepping switch bank 640.

Thus, it will be noted that when the stepping switch movable arms 630, 466, 482, and 632 are at the respective terminals 1 of the respective stepping switch banks, the information signal lines 462 and 464 will be coupled through stepping switch information signal movable arms 466 and 482 respectively to input line 654 and 666 respectively leading to the first recorder 658. At the same time the local calibrate power supply 714 voltage appears through stepping switch local calibration signal movable arms 630, 632 and lines 709 and 712 respectively at the fourth recorder 704. When the movable arms of the stepping switch 468 advance to the respective terminals 2 of the stepping switch banks, the information signal lines 462 and 464 will be coupled through stepping switch information signal movable arms 466 and 482 respectively to input lines 698 and 700 respectively leading to the second recorder 694. At the same time, the calibrate power supply 714 will be coupled through stepping switch local calibrate signal movable arms 630 and 632 to the input lines 654 and 660 respectively to the first recorder 658.

In like manner, when the stepping switch movable arms 630, 466, 482, and 632 advance to the respective terminals 3 of the stepping switch 468 the information signal lines 462 and 464 will be coupled through stepping switch information signal movable arms 466 and 482 respectively to input lines 707 and 710 respectively leading to the third recorder 702. At the same time, the calibrate power supply 714 will be coupled through stepping switch calibrate signal movable arms 630 and 632 to the input lines 698 and 700 respectively leading to the second recorder 694.

In similar manner, when the stepping switch arms 630, 466, 482, and 632 move to the respective terminals 4 in the terminal banks of the stepping switch 468, the information signal lines 462 and 464 will be coupled through stepping switch information signal movable arms 466 and 482 to the input lines 708 and 712 leading to the fourth recorder 704. At the same time, calibrate voltage power supply 714 will be coupled through stepping switch local calibrate signal movable arms 630 and 632 to input lines 707 and 710 respectively leading to the third recorder 702.

Thus it will be noted that while one recorder is recording information signals from information signal lines 462 and 464, another recorder is receiving a calibration signal which it is recording as a reference for checking the correctness of the recorder operation.

Line 550 from the station relay and energizing power supply 552 is coupled through a line 716 to one end of a solenoid 718 of a power loss relay 720 the other end of which is grounded. The power loss relay 720 has a movable arm 722 normally coupled at one end to one terminal of a self-contained power loss alarm 724 normally held by the solenoid 718 from engagement with a contact 726 coupled through a manual switch 728 to the other terminal of the power loss alarm 724. Thus, so long as there is power output from the station relay energizing power supply 552 it energizes the coil 718 of the power loss relay 720 so as to maintain an open circuit at the terminal 726. However, when power loss occurs, the solenoid 718 will be de-energized so that movable arm 722 will make contact with the terminal 726 and if the manual switch 728 is closed, the power loss alarm 724 will be energized to attract attention of operating personnel.

In the operation of the present invention, manual switch 728 in the power loss alarm circuit 724 is closed to insure an alarm indication if power should be lost at any time as explained above. Manual switch 674 in the recorder section 460 is closed to start movement of the charts in the chart recorders, 658, 694, 702, and 704, as explained above. Manual to automatic operation switch 384 is moved to the right (as shown) so as to cause movable manual to automatic switch arms 386, 388, and 390 to electrically engage terminals 394, 396, and 398 respectively whereby to transfer the telephone lines 300 and 402 to information signal lines 462, 464, and alarm circuit line 530 respectively for automatic operation of the automatic logging system 200.

The "Raise-Lower" switch 20 in the control circuit 10 is to the left to the "Raise" position to cause grounding relay 90 to be energized, thereby grounding line 372 through terminal 154, movable arm 155, and ground line 153 so as to complete the circuit through line 372, latching relay operate solenoid 370, power line 348 to the station relay energizing power supply 350. This energizes the operate solenoid 370 of the latching relay 356.

Operation of latching relay 356 causes movable arms 354 and 360 to electrically engage terminals 352 and 362 respectively, thereby energizing the remotely located manual-to-automatic switching relay 296 so as to cause movable arms 338 and 292 to electrically engage terminals 336 and 294 respectively so as to electrically couple the output signal lines 334 and 292 to the telephone lines 402 and 300 respectively leading to the combined receiving and recording assembly 206.

The grounding of line 372 causes the remotely operated station relay 280 to thereby also be grounded through line 374 and thereby energized, causing the movable arm 322 to electrically engage terminal 408. Thus, the potential of the common power supply line 406 appears through the terminal 408 and the movable switch arm 322 at movable switch arm 326. Thus, when the timing cam 328 is in position wherein movable arm 326 is in electrical engagement with the terminal 330, the voltage from the common control relay energizing power supply line 406 will appear through lines 332 and line 334, terminal 336 telephone line 402, movable arm 386, terminal 394 and line 586 in the relay control and alarm section 456.

The higher voltage in the control relay energizing power supply 410 appears through higher voltage line 414, terminal 454, movable arm 278 when in engagement with the terminal 453 by the simultaneous action of the linkage 324, movable arm 282, terminal 288, line 290, line 292, terminal 294, movable arm 298, telephone line 300, movable arm 388, terminal 396, line 464, and the rectifier 580, line 578, to operate the higher voltage relay 584. Operation of the higher voltage relay 584 causes the grounding of higher voltage relay movable arm 648 on grounded terminal 650, thereby energizing the holding relay 608. The holding relay 608 remains operative by movable arm 612 electrically engaging terminal 646 to complete a ground circuit through line 614, terminal 616 (when stepper cam 620 is in any other than the starting position shown in FIG. 1) movable arm 618 to ground.

At the same time movable arm 606 electrically engages terminal 610 in the holding relay 608 so as to complete the circuit through relay movable arm 602 and terminal 600 to energize the stepping relay solenoid 596 from power supply 552 and thereby causing the stepping switch 468 to continuously index by repetitive movement of stepping switch movable arm 602 until the raised portion 622 on the stepping switch cam 620 breaks the circuit at terminal 616 as shown in FIG. 1 illustration at which point the movable stepping switch wiper arms 630, 466, 482, and 432 are at the starting position, in engagement with the respective stepping switch bank terminals 1.

Simultaneously with the above, the operation of the remotely operated station relay 280 causes grounded movable arm 424 to engage terminal 426 so as to complete the circuit through line 430, terminal 432 (where the stepping switch cam 436 is in other than the starting position shown in FIG. 1A), terminal 442, stepping switch movable arm 444, the stepping relay solenoid 446, line 348, and the station relay energizing power supply 350. Thus, the stepping relay solenoid 446 is energized to cause a rotation of the stepper cam 436 together with the rotation of the movable stepping switch wiper arms 224, 222, 220, and 218 until they reach their respective stepping switch bank starting terminals 1 and at which point the raised portion 438 on the stepping switch cam 436 raises the movable stepping switch arm 434 so as to break the circuit at the terminal 432 to de-energize the stepping relay 446 at the above-mentioned start position. This action thereby synchronizes the starting position of stepping switch 468 at the receiving and recording station 206 with the starting position of the stepping switch 208 at the remote information signal selecting and transmitting station 202.

It should be noted also that when the latching relay 356 is energized as explained above, the movable arm 360 electrically engages terminal 362 so as to complete the circuit through line 364 and 366 to the timing motor 268 causing a rotation of the timing cam shaft 286 with the above described timing cams thereon.

Figure 2:
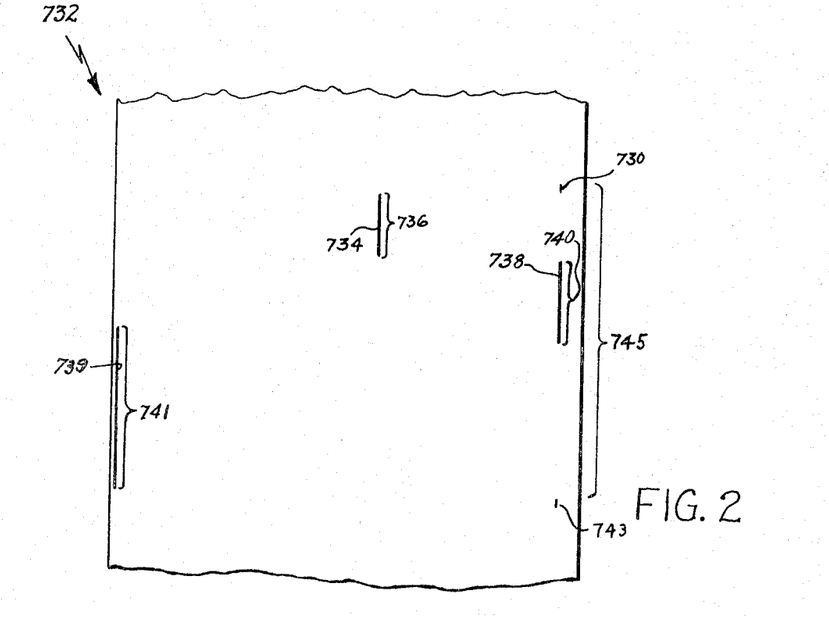
FIG. 2 is an exemplary showing of indications of information signals recorded by the present invention, for more clearly showing operation.

In starting position with the wiper arms of all of the stepping switch banks on terminals 1, it will be noted that at the remote equipment 204 being monitored, signal source 232 is coupled through potentiometer resistor 230 to terminal 1 of the information signal stepping switch bank 210 and through line 234 to terminal 1 of the information signal stepping switch bank 212. The information signal from the signal source 232 will thereby appear in the information signal channel 236 and across the information signal terminals 262 and 308, which as shown in FIG. 1A not being in engagement with the information signal timer relay movable arms 264 and 310 respectively will, because of timing by the information signal timing cams 266 and 312 respectively, not appear in the telephone lines 402 and 300. Instead, during this initial period chart recorder 658 which is connected to terminals 1 of information signal banks 636 and 638 will be indicating a remote calibrate signal shown by the line 730 in a strip chart 732 moving through the recorder 658 at that time. The remote calibrate signal 730 is the signal from calibrate voltage power supply 274 appearing between terminals 318 and 272, as adjusted by the potentiometer 316. This calibrate signal 730 is first on the chart 732 because the remotely operated relay 280 has its solenoid 276 de-energized as soon as the "Raise-Lower" switch 20 falls back to its neutral position after being deflected to place the stepping switches in start position as described above. The de-energization of the remotely operated relay 280 causes movable arms 322 and 278 to fall back onto the terminals 320 and 276 respectively so as to complete the circuit from the calibration voltage power supply 274 through the telephone lines 402 and 300 to the chart recorder 658.

After this brief period of recording of the remote calibrate signal 730, the information signal timing cams 266 and 312 cause information signal timing cam movable arms 264 and 310 to engage the information signal terminals 262 and 308 respectively so as to make circuit with the information signal channel 236 and thereby substitute the signal from the information signal source 232 in place of the remote calibrate signal 730 from the calibration power supply 274. Thus, this information signal from the information signal source 232 will appear through the telephone lines 402 and 300 respectively at the chart recorder 568 as the recorded information signal 734 on the chart 732.

After the remote information signal 734 has been recorded for a period 736 pre-set on timing cams 266 and 312 (about 2½ minutes in the present instance) the stepper cam 452 is set to cause the stepper cam switch 448 to close for a brief period so as to complete the circuit from the station energizing relay power supply 350 through line 348, stepping switch solenoid 446, switch 448, line 450, terminal 428 in the remotely operated relay 280, movable arm 424 to ground. Energizing the stepping switch relay solenoid 446 in this manner causes the movable arms 218, 220, 222 and 224 in stepping relay 208 to move to the respective terminals numbered 2 in the stepping switch terminal banks 210, 212, 214, and 216 respectively.

Immediately thereafter, the synchronizing cams 420 and 422 cause the synchronizing terminals 404 and 418 to close for a brief period so as to cause the movable arms in the stepping switch 468 to advance to terminals numbered 2 in the respective terminal banks therein so as to be synchronized with the stepping switch 208. This synchronization occurs as follows; when the synchronizing cams 420 and 422 cause the synchronizing switches 404 and 418 to close, the voltage in common line 406 from the control relay energizing power supply 410 appears through the synchronizing switch 404, line 334, terminal 336, movable arm 338, telephone line 402, movable arm 386, terminal 394, line 462, potentiometer 588, line 586, high voltage solenoid 582, the low voltage solenoid 576 which is thereby energized, line 578, rectifier 580, terminal 396, movable arm 388, telephone line 300, movable arm 298, terminal 294, line 292, the other closed synchronizing switch 418, line 416, movable arm 222 in the synchronizing stepping switch bank 214, terminal 2 of bank 214, the lower voltage line 412 to the control relay energizing power supply 410. Thereby the lower voltage from the control relay energizing power supply 410 energizes the lower voltage relay 574 so as to cause movable arm 590 to be grounded on terminal 592 to complete the circuit through line 594, stepping relay solenoid 596 and the station relay energizing power supply 552. The energizing of solenoid 596 momentarily in this manner causes the movable arms 630, 466, 482, and 632 in the stepping switch terminal banks 634, 636, 638 and 640 to simultaneously move from the respective terminals numbered 1 to the respective terminals numbered 2.

The movement of the movable switch arm 630 from terminal 1 to terminal 2 thereby completes the circuit from local calibration voltage power supply 714, line 654, potentiometer 656 to the recorder 658 in the recorder section 460. The other line 660 of recorder 658 is coupled through solenoid 662 of the alarm meter 664, line 666, terminal 2 in switch bank 640, movable arm 632, potentiometer 716 to the other side of the local calibration voltage power supply 714. Thereby the local calibration voltage from the local calibration voltage power supply 714 will appear, as adjusted by the potentiometers 656 and 716, and be recorded as the local calibration voltage 738 on the chart 732 at the recorder 658 during this period 740 when the movable arms of the stepping switch 468 are on their respective terminals numbered 2 (in this instance a period of 3 minutes).

After the three minute period 740 (or any other desired period set in the cams), the stepping switch timing cam 452 causes a momentary closing of the cam operated timing switch 448 so as to momentarily energize the stepping relay solenoid 446 and thereby advance the movable arms 218, 220, 222, and 224 in the stepping switch terminal banks 210, 212, 214, and 216 respectively to the respective terminals numbered 3.

Thereupon the synchronizing cams 420 and 422 again cause a momentary closing of the synchronizing switches 404 and 418 so as to again momentarily energize the lower voltage relay solenoid 576 to cause a similar advance of the movable switch arms 630, 466, 482, and 632 to the respective terminals numbered 3 in local stepping switch 468. During this period the recorder 658 has no signal to record therein and will therefor record its zero reference setting 739 throughout this no information signal period labelled 741. The duration of period 741 includes the time during which the stepping switch arms are on terminals 3 and 4 and return to the start position on terminals 1, as explained above, the return to the start position will occur when the movable switch arm 222 in the synchronizing terminal bank 214 reaches terminal 5 which is coupled to the higher voltage line 414 for energizing the higher voltage relay 584 to effect a repetitive indexing of stepping relays 208 and 468 back to the respective starting position terminals 1 where the chart recorder 658 will again initially record the remote calibrate signal from the remote calibrate voltage supply 274 as the recording 743 in the strip chart 732. The cycle will then automatically repeat itself as explained above.

It should be noted that in this same manner, the sequential indexing of the stepping switches 208 and 468 cause similar sequential recordings from the signal sources 242, 250, and 258 in the recorders 694, 702, and 704 respectively, each of which have strip charts similar to the chart 732 and a similar sequence pattern with a complete cycle time identified on the strip chart 732 by the numeral 745. From the above description, it is seen that all the recorders are operating continuously with each at a different point in its cycle. Thus, while recorder 658 is recording the remote information signal 734, the recorder 704 is recording its local calibrate signal and the remaining two recorders are recording their zero setting, or no signal positions. When recorder 694 records its remote information signal, the recorder 658 will be recording its local calibrate signal and the remaining two recorders will be at their zero reference positions, etc.

It should be noted that if a signal appearing in line 464 is below or above the limits set by the terminals 486 in the alarm meter 478, the movable arm 480 will engage the particular terminal which if below, will be terminal 486 and will energize the alarm relay 484 to thereby cause contact of the movable arm 522 on terminal 514 which contact upon existing the period set on the thermal time delay relay 526 will close movable arm 538 to engage terminal 540 to energize the alarm relay 520 and thereby activate alarm 558 and alarm light 568 until push button switch 544 is depressed as described above.

Similarly, malfunction signal in the line 660 causes contact in the alarm meter 664 to energize alarm relay 682 so as to close movable arm 686 on terminal 688 to make circuit with the thermal time delay switch 526 and upon proper time duration will again cause excitation of alarm 558 and alarm light 568.

Figure 3:
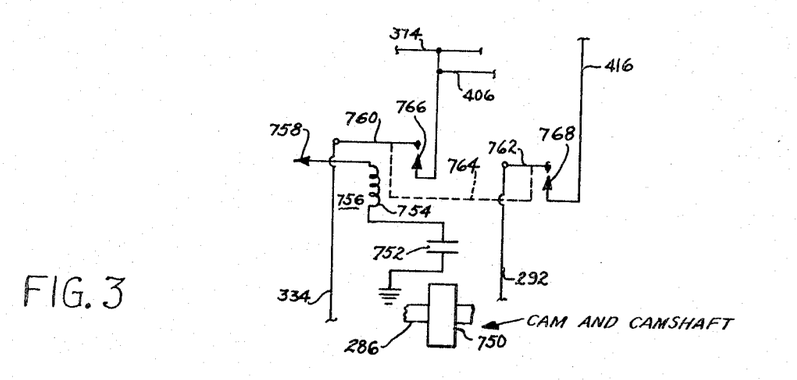
FIG. 3 is a schematic diagram showing an alternative construction of a portion of the FIG. 1A embodiment.

An alternative structure which may be used at the synchronizing cams 420 and 422 is shown in FIG. 3. In FIG. 3 the synchronizing cams 420 and 422 are replaced by a single synchronizing cam 750 on the timing shaft 286 and arranged to close a normally open switch 752 which replaces the two synchronizing switches 404 and 418. The synchronizing switch 752 is grounded on one side with the other side coupled through a solenoid 754 of a synchronizing relay 756, and a line 758 to the station relay energizing power supply 350. The synchronizing relay 756 has movable switch arms 760 and 762 connected by a member 764 to operate in unison so that when the synchronizing switch 752 is closed by the synchronizing cam 750 so as to energize the solenoid 754 of the synchronizing relay 756, the relay arms 760 and 762 will engage terminals 766 and 768 respectively. The terminal 766 is coupled to the lines 374 and 406 while the movable arm 760 is coupled to the line 334. The terminal 768 is coupled to the line 416 and movable arm 762 is coupled to line 292.

Operation of the switch 752 is effected by the synchronizing cam 750 at the same instant as that described above with respect to switches 404 and 418 for closing of the synchronizing circuit to lines 332 and 292 as explained above with regard to the switches 404 and 418.

This invention is not limited to the particular details of construction and operation described, as equivalents will suggest themselves to those skilled in the art.

What is claimed is:

1. In an automatic information signal logging system, the combination of a remote station having a plurality of information signal channels adapted for coupling to respective information signal sources, said remote station including a control signal means and an indexing means in responsive relation to said control signal means and in control relation to said information signal channels and adapted for cyclic sequential coupling to respective of said channels in response to control signals from said control signal means, each coupling for a predetermined time period, a receiving and recording station having an information signal channel and a control signal channel and unidirectional current valves oriented for selectively confining said control and information signals to the respective channel, said receiving and recording station including a plurality of information signal, recording devices, an indexing means in the control signal channel in responsive relation to said control signals and in control relation to said recording devices and adapted for cyclic sequential coupling of said information signal channel to respective of said recording devices in response to said control signals from said control signal means, and a signal transmission means coupling the remote station to the recording station for transmission of said control signals in a manner to synchronize said receiving station indexing means with the indexing means of said remote station for sequentially coupling each information signal channel of the remote station to a corresponding recording device at said receiving and recording station, thereby sequentially recording the information signals from each channel of the remote station on the corresponding recorder at the recording station during each predetermined time period.

2. The combination as in claim 1 wherein the remote station and recording station indexing means include stepping switches.

3. The combination as in claim 1 wherein the remote station and recording station indexing means include stepping switch means for selectively coupling to respective information signal channels, and said control signal means including timing control switching means for providing the time interval and sequence of signals passing from the remote station to the recording station.

4. The combination as in claim 1 wherein the signal transmission means includes a pair of electrically conductive wires coupled to the remote and recording stations.

5. A system for monitoring at a monitoring station the functions of a remotely located equipment characterized by a plurality of individual function signal sources comprising, in combination, a pair of function signal transmission lines, a function signal indexing and cycling means coupled to one end of the transmission lines and adapted for sequentially and automatically channeling to said transmission lines individual ones of function signals from said function signal sources, a plurality of functional signal indicating devices at the monitoring station, each indicating device for a separate one of the function signal sources, indexing means coupled to the other end of the transmission lines in responsive relation to the first mentioned indexing and cycling means and adapted for sequentially and automatically channeling from said transmission lines the function signals to corresponding individual ones of the indicating devices and an alarm circuit in the function signal path, the alarm circuit including a time delay circuit in control relation to the alarm, and a relay having a limit contact arrangement for closing the time delay circuit in response to an abnormal function signal.

6. The combination as in claim 5 wherein the function signal indexing and cycling means includes a rotary stepping switch and timing motor with associated cycling cams and cam operated switches adapted for providing the sequential automatic channeling of individual function signals from the function signal sources to the transmission lines.

7. The combination as in claim 5 wherein the function signal indexing and cycling means include a rotary stepping switch and timing motor with associated cycling cams and cam operated switches adapted for providing the sequential automatic channeling of individual function signals from the function signal sources to the transmission lines; and the indexing means at the monitoring station including a rotary stepping switch for channeling the function signals from the transmission lines to the indicating devices.

8. The combination as in claim 5 wherein the indicating devices are chart recorders.

9. The combination as in claim 5 wherein the indicating devices are strip chart recorders.

10. The combination as in claim 5 wherein said alarm circuit is in the path of a function signal to a selected indicating device.

11. The combination is in claim 5 having an additional alarm circuit in the path of a function signal to a corresponding indicating device, the additional alarm circuit including an alarm meter having a limit contact and a meter movement responsive to said function signal for closing the contact in response to an abnormal function signal to said corresponding indicating device.

12. An automatic remote logging system for sequentially selecting and recording a plurality of electric information signals from a plurality of electric signal sources comprising, in combination, a pair of telephone lines; signal selecting and transmitting means at the source of electric information signals which include a control signal, a calibration signal, and a plurality of function signals to be recorded; said selecting and transmitting means including a multiple bank stepping switch, a cycle timer including a plurality of timer cams, cam operated switch means in responsive relation to the cycle timer cams, a portion of said cams with associated switch means in control relation to the multiple bank stepping switch for making sequential coupling of selected function signal sources to one end of the telephone lines, other of said cams with associated switch means in control relation to said control signal source and calibration signal source for sequentially coupling said control signal source and calibration signal source to said one end of the telephone lines between each of said function signal couplings, control and recording means at the other end of the telephone lines, the recording means including a plurality of signal recorders corresponding to the number of function signals to be recorded and a multiple bank switch coupled to the recorders for selecting a particular recorder for a corresponding function signal, the control means including a plurality of relays in responsive relation to the control signal and in control relation to the last mentioned stepping switch for synchronizing the operation of said stepping switch with the stepping switch in the signal selecting and transmitting means to record in continuous sequence the calibration and function signal from each of said sources on the corresponding recorder of said recording means.

13. The combination as in claim 12 having additionally an alarm circuit in the function signal path and in responsive relation to abnormal values of function signal.

14. The combination as in claim 12 wherein the control and recording means include two channels, one channel for the control signals and the other channel for the function and calibration signals.

15. An automatic remote logging system for sequentially selecting and recording a plurality of electric information signals from a plurality of electric signal sources comprising, in combination, a pair of telephone lines; signal selecting and transmitting means at the source of electric information signals which include a control signal, and a plurality of function signals to be recorded; said selecting and transmitting means including a multiple bank stepping switch, a cycle timer, switches in responsive relation to the cycle timer and in control relation to the multiple bank stepping switch for making sequential circuit with selected information signal sources and one end of the telephone lines, control and recording means at the other end of the telephone lines, the recording means including a function signal channel, a plurality of signal recorders corresponding to the number of function signals to be recorded, and a multiple bank stepping switch coupled to the recorders and function signal channel for selecting a particular recorder for a corresponding function signal; the control means including a control signal channel, a plurality of relays in the control signal channel in responsive relation to the control signal and in control relation to the last mentioned stepping switch for synchronizing the operation of said stepping switch with the stepping switch in the signal selecting and transmitting means, and unidirectional current valves oriented in said function signal and control signal channels for selectively confining said signals to the respective channels.

16. An automatic remote logging system for sequentially selecting and recording a plurality of electric information signals from a plurality of electric signal sources comprising, in combination, a pair of telephone lines; signal selecting and transmitting means at the source of electric information signals which include a control signal and a plurality of function signals to be recorded; said selecting and transmitting means including a multiple bank stepping switch, a cycle timer, switches in responsive relation to the cycle timer and in control relation to the multiple bank stepping switch for making sequential circuit with selected information signal sources and one end of the telephone lines; an alarm circuit, control and recording means at the other end of the telephone lines; the alarm circuit being in the function signal path and including a time delay circuit in control relation to the alarm and a relay having a limit contact arrangement for closing the time delay circuit in response to an abnormal function signal; the recording means including a plurality of signal recorders corresponding to the number of function signals to be recorded and a multiple bank switch coupled to the recorders for selecting a particular recorder for a corresponding function signal; the control means including a plurality of relays in responsive relation to the control signal and in control relation to the last mentioned stepping switch for synchronizing the operation of said stepping switch with the stepping switch in the signal selecting and transmitting means.

17. An automatic remote logging system for sequentially selecting and recording a plurality of electric information signals from a plurality of electric signal sources comprising, in combination, a pair of telephone lines; signal selecting and transmitting means at the source of electric information signals which include a control signal and a plurality of function signals to be recorded; said selecting and transmitting means including a multiple bank stepping switch, a cycle timer, switches in responsive relation to the cycle timer and in control relation to the multiple bank stepping switch for making sequential circuit with selected information signal sources and one end of the telephone lines; control and recording means at the other end of the telephone lines; the recording means including a plurality of signal recorders corresponding to the number of function signals to be recorded, a multiple bank stepping switch coupled to the recorders for selecting a particular recorder for a corresponding function signal, and an alarm circuit in the path of a function signal to one of said recorders, the alarm circuit including an alarm, an alarm meter having a limit contact and a meter movement responsive to said function signal for closing the contact when said function signal is abnormal, and a time delay circuit in control relation to the alarm and in responsive relation to said contact; the control means including a plurality of relays in responsive relation to the control signal and in control relation to the last mentioned stepping switch for synchronizing the operation of said stepping switch with the stepping switch in the signal selecting and transmitting means.

References Cited by the Examiner

UNITED STATES PATENTS

| | | | |
|---|---|---|---|
| 2,283,070 | 5/1942 | Leathers | 340—183 |
| 2,485,730 | 10/1949 | Giffen et al. | 340—183 X |
| 3,047,845 | 7/1962 | Hansson | 340—184 |
| 3,217,306 | 11/1965 | Hillman | 340—183 X |
| 3,231,670 | 1/1966 | Lane et al. | 179—2 |

DAVID G. REDINBAUGH, *Primary Examiner.*

J. T. STRATMAN, *Assistant Examiner.*